UNITED STATES PATENT OFFICE 2,645,277

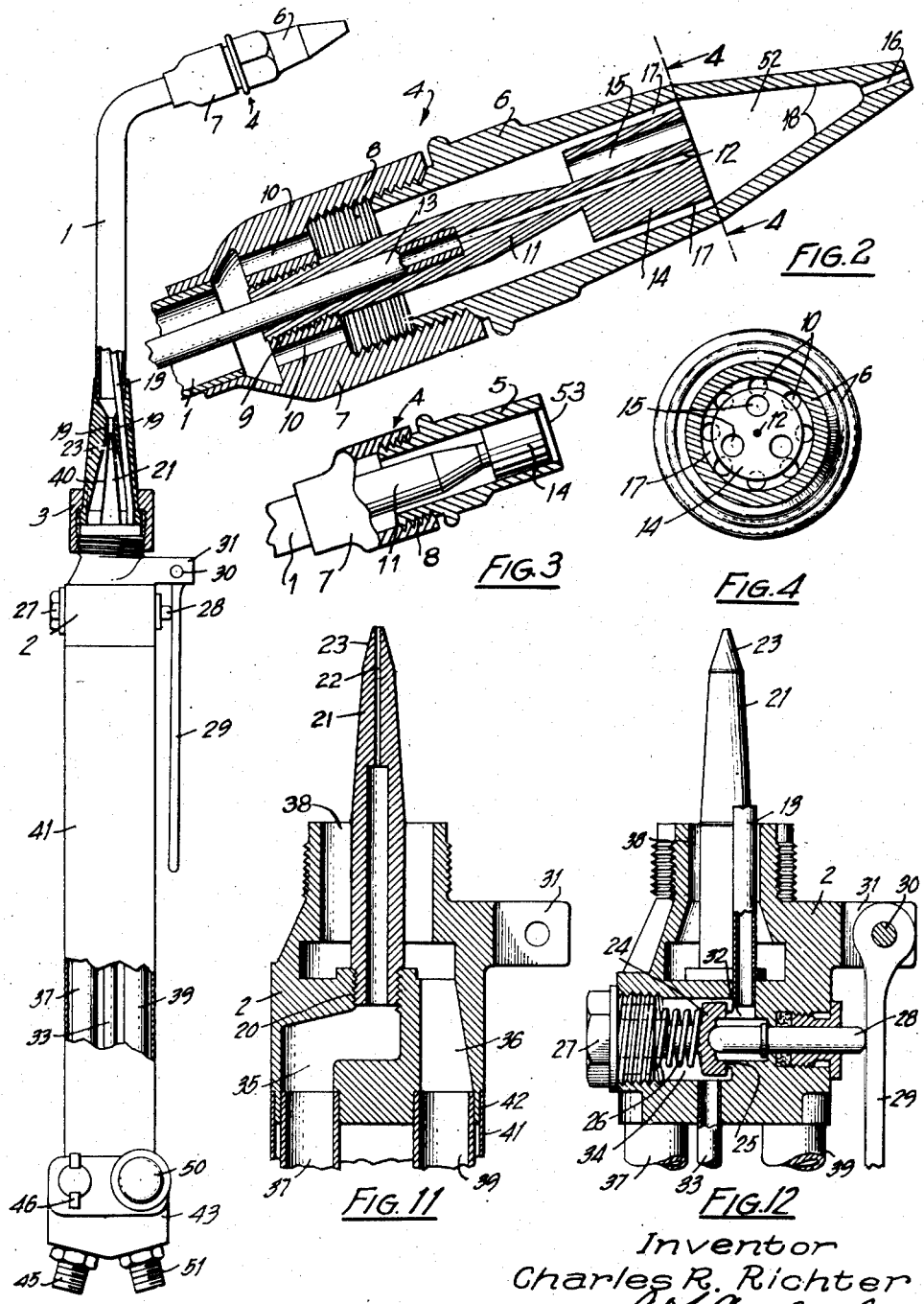

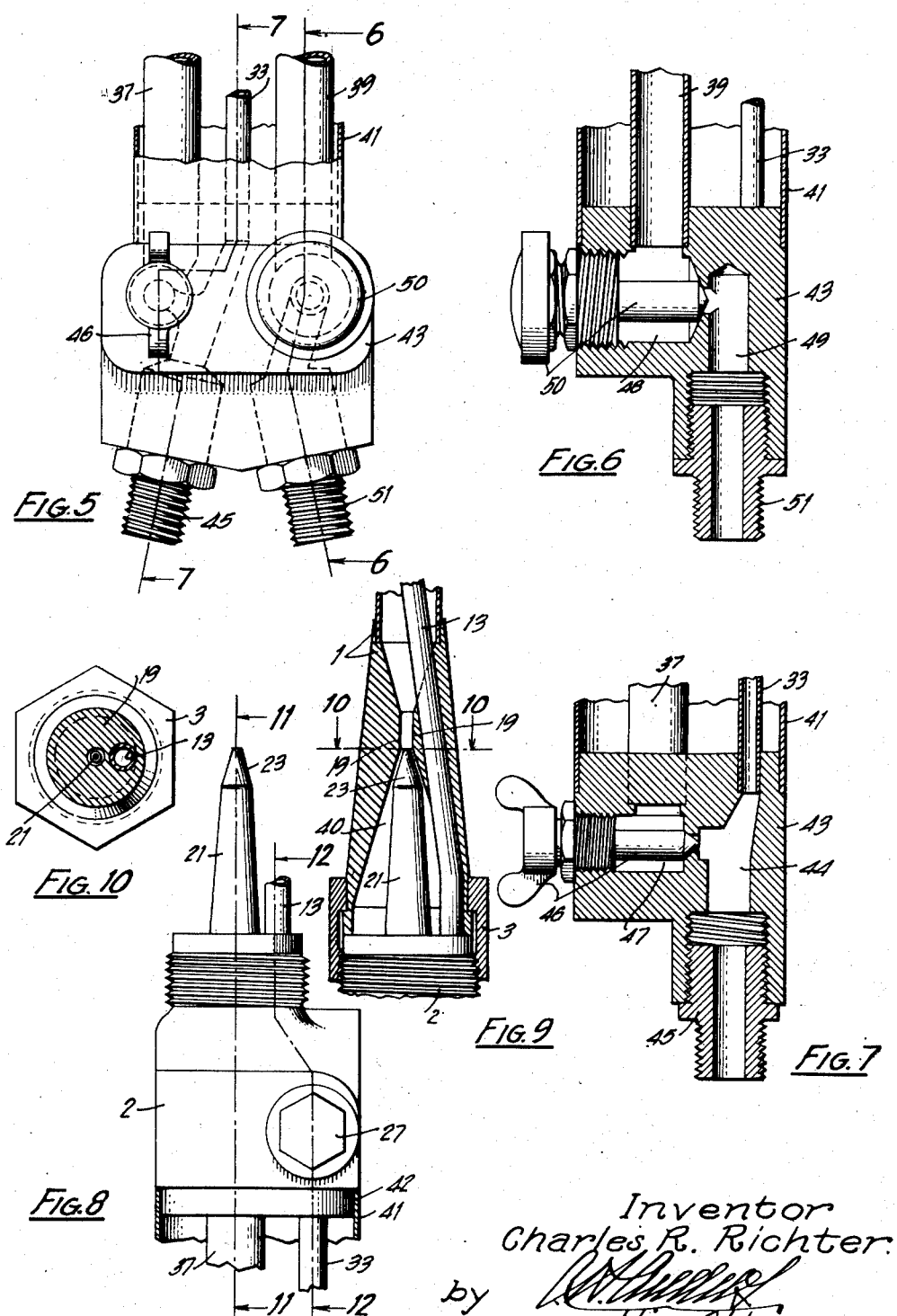

WELDING AND CUTTING TORCH

Charles R. Richter, Schenectady, N. Y.

Application November 23, 1948, Serial No. 61,719

1 Claim. (Cl. 158—27.4)

My invention relates to torches for use in welding, brazing, cutting, and the like operations and particularly to a torch of this character which, although it may be used with combustible gases under high pressure, is primarily designed for use with gases under low pressure, such as gases used in cities for cooking and other purposes.

So far as I am aware, there is no torch available at the present time which can be used satisfactorily for welding with gas, such as city gas, under comparatively low pressure. There are torches in which such gases under comparatively high pressure can be used for welding, but expensive extra equipment, in the way of compressers, storage tanks and the like, is required.

As is well understood in the art, in order to produce the high temperatures which are necessary for welding, large volumes of gas must be burned in a restricted zone at a very high rate of combustion. The principal difficulty encountered in attempting to use gases, and particularly gases such as city gas having a low B. t. u. rating, directly from the mains or pipes under the pressures universally prevailing therein, is to discharge the gas from the nozzle of the torch at a rate sufficiently high to develop the necessary heat. There is no particular problem involved where combustible gas is available from a high pressure source of supply but the situation is quite different where the gas is delivered to the torch from a low pressure supply thereof.

One of the principal objects of my invention is to provide a torch which may be successfully used for welding, brazing, cutting, heating and the like with gas drawn directly from a low pressure supply thereof. Another object is to provide a single torch unit which may be converted from a welding torch to a cutting torch, and vice versa, by merely changing the nozzle thereof. A further object is to provide a torch of such design that a combustible gas may be delivered thereto directly from a low pressure source of supply but which will be delivered to and discharged from the nozzle of the torch at a substantially higher pressure than exists in the source of supply and thoroughly admixed with oxygen.

I accomplish these and other objects which will be apparent as the description of my invention proceeds, by means of the novel elements and the combinations and arrangements thereof described below and illustrated in the accompanying drawings in which—

Fig. 1 is a side elevation view with portions broken away and portions in section showing my torch with a welding nozzle thereon;

Fig. 2 is a longitudinal section through the tip;

Fig. 3 is a small scale view partially in section of the tip when equipped with a cutting nozzle;

Fig. 4 is a section of Fig. 2 in the plane 4—4;

Fig. 5 is an enlarged side elevation with portions broken away of the valve housing shown at the bottom of Fig. 1;

Fig. 6 is a section of Fig. 5 in the broken planes 6—6;

Fig. 7 is a section of Fig. 5 in the broken planes 7—7;

Fig. 8 is an enlarged side elevation of the valve housing at the other end of the handle and to which the torch pipe is attached;

Fig. 9 is an enlarged, longitudinal section through the injector;

Fig. 10 is a section of Fig. 9 in the plane 10—10;

Fig. 11 is a section of Fig. 8 in the plane 11—11; and

Fig. 12 is a section of Fig. 8 in the broken planes 12—12.

Referring to the drawing and first, more particularly to Figs. 1, 2, 3 and 4, my torch comprises a torch pipe 1, of comparatively large cross-sectional area throughout the major portion thereof and which is secured to the valve housing 2 by means of the coupling nut 3. Secured to the free end of the torch pipe 1 is the tip shown in Figs. 2 and 3, represented generally by the numeral 4. The tips shown in Figs. 1, 2 and 3 are identical except that the tip nozzle 5, shown in Fig. 3, is a cutting nozzle while the tip nozzle 6, shown in Figs. 1 and 2, is a welding nozzle.

Each of the tips comprises a cup-like base 7, which is permanently secured to the torch pipe 1, and which is open at the other end and internally threaded, as shown at 8, to receive the interchangeable nozzles 5 and 6. The base 7 has an internally threaded diaphragm or spider 9 therein which is provided with a plurality of circumferentially-spaced, longitudinally-extending passages 10 to pass the gas from the torch pipe 1. Threaded into the spider 9 and disposed in laterally-spaced relation to the interior wall of the base 7, to provide for the flow of gas therebetween, is a small tube or pipe 11 having the passage 12 through the forward portion thereof substantially reduced in size to discharge a needle-like jet of oxygen for use in cutting. The tube or pipe 11 is counterbored at the rear end to receive the small pipe 13, the function of which will be described below. The forward end of the tube 11 is provided with a cylindrical enlargement 14 having a plurality of equicircumferentially-spaced passages 15 therethrough for the flow of gas. When the torch is to be used for welding, a nozzle of the type shown at 6 in Figs. 1 and 2, is threaded into the base 7 and is provided at its forward extremity with a comparatively small discharge orifice or passage 16. The cylindrical enlargement 14 on the pipe 11 is of less diameter than the internal diameter of that portion of the nozzle 6 immediately surrounding it so that an annular gas passage 17 is provided therebetween. The passage through the nozzle 6 beyond the enlargement 14 on the pipe 11 converges towards the discharge orifice 16, as shown at 18.

Referring now more particularly to Figs. 1, 8, 9, 10, 11 and 12, the torch pipe 1, adjacent its connection to the valve housing 2, is provided with means 19 forming a Venturi-like restriction therein and the valve housing 2 has threaded therein, as shown at 20 in Fig. 11, a nozzle element 21 having a comparatively small passage 22 therethrough and which is tapered at the free end thereof, as shown at 23. The nozzle 21 is so disposed with respect to the means 19 forming the Venturi-like restriction in the torch pipe 1, and in such axially and laterally spaced relation thereto that it will cooperate with the means 19 to form an injector, the function of which will be described below. Extending from the valve housing 2 through the means forming the restriction in the torch pipe 1, and running longitudinally through the torch pipe 1, is the small pipe or tube 13 which communicates with the pipe or tube 11 in the tip.

Referring now more particularly to Fig. 12, the valve housing 2 is provided with a poppet valve 24 which is normally held against its seat 25 by means of the helical spring 26 and the threaded plug 27. A plunger 28 cooperates with the valve 24 and may be depressed to open the valve by squeezing the lever 29, which is pivotally mounted at 30, between the ears 31 on the valve housing 2. The pipe 13 communicates with a space 32 on the plunger side of the valve 24 and a pipe 33 communicates with the space 34 in the valve housing 2 on the other side of the valve 24. Thus, communication between the pipe 13 and the pipe 33 is normally cut off by the valve 24 but communication may be provided between these pipes by opening the valve 24 by manipulating the lever 29.

The valve housing 2 is provided with separate passages 35 and 36 therethrough (see Fig. 11) in addition to the passages through the valve 24. The passage 35 communicates with the nozzle 21 and a pipe 37 which is secured in the lower end of the valve housing 2 is adapted to supply oxygen to the nozzle 21. The passage 36 communicates directly with the torch pipe through the annular passage 38 in the valve housing which surrounds nozzle 21, and a pipe 39 which is secured to the bottom of the valve housing 2 is adapted to supply a combustible gas through the passages 36 and 38 to the zone 40 in the torch pipe 1 (see Figs. 1 and 9) which immediately surrounds the discharge end of the nozzle 21. Enclosing the pipes 33, 37 and 39 is an elongated, cylindrical casing 41 which is soldered or otherwise secured at 42 by means (not shown) to the bottom of the valve housing 2, as shown in Figs. 8 and 11.

Referring now more particularly to Figs. 5, 6 and 7, the other end of the casing 41 is secured by soldering or otherwise (not shown) to the top of a second valve housing 43 with which the pipes 33, 37 and 39 communicate. The pipe 33 communicates with a passage 44 in valve housing 43 which, in turn, communicates with the threaded nipple 45 to which a pipe leading to a source of supply of oxygen under pressure is adapted to be connected. It will be apparent from the foregoing that oxygen may flow freely directly from the source of supply thereof through the nipple 45, passage 44 and pipe 33 into the space 34 in the valve housing 2, but that it cannot flow into the pipe 13 unless the valve 24 is opened. By reference to Fig. 7, it will be noted that the passage 44 in valve housing 43 communicates through needle valve 46 with a space 47 in the housing 43 which, in turn, communicates with pipe 37. Thus, by opening the valve 46, oxygen from the source of supply thereof may flow through the nipple 45, passage 44, through the valve 46 and pipe 37 directly to the nozzle 21 (see also Fig. 11). Hence, by opening valve 46, oxygen under high pressure from the source of supply thereof will be discharged through nozzle 21 into the Venturi-like restriction in torch pipe 1.

Pipe 39, which communicates directly with the torch pipe in the zone thereof surrounding the nozzle 21, communicates with a space 48 (see Fig. 6) in valve housing 43 and with the space 48 may placed into communication with, or cut off from, communication with the passage 49 in the housing 43 by means of the valve 50. The passage 49 communicates with nipple 51 which is adapted to be connected to a source of supply of a combustible gas such, for example, as a city gas main.

By opening valve 50, such gas may flow freely through pipe 39 into the space in the torch pipe around nozzle 21. In operation, the nipples 45 and 51 are connected, respectively, to a source of supply of oxygen under substantial pressure and a source of gas supply which may be under very low pressure. If the torch is to be used for welding, the nozzle 6 is used on the tip and the valves 46 and 50 are opened and adjusted to produce, when ignited at the orifice 16 in the nozzle 6, a flame of the desired character. The oxygen issuing at substantial velocity from the nozzle 21 through the restriction in the torch pipe, induces a flow of the low pressure combustible gas surrounding the torch 21, through the restriction in torch pipe 1 into said pipe where it is thoroughly intermixed with the oxygen and flows from said pipe through the passages 10, the space surrounding the pipe 11 within the nozzle 6, around the cylindrical enlargement on the end of pipe 11 and through the passages 15 therein into the space 52 in the forward end of the nozzle 6, and thence through the discharge passage 16 in the end of said nozzle.

When the torch is to be used for cutting, it is necessary only to unscrew the nozzle 6 from the base 7 of the tip and substitute therefor the nozzle 5, as shown in Fig. 3. The nozzle 5 has, at its outer end, an inturned lip 53 which overlies the forward marginal edge of the enlarged cylindrical portion 14 on pipe 11, so that the flow of gas therethrough is confined to the passages 15. Gas flowing through these passages serves to heat and maintain hot the material to be cut and the cutting is accomplished by pressing lever 29 to open valve 24 which discharges a jet of oxygen from the passage 12 in the center of the cylindrical enlargement 14.

From the foregoing it will be apparent that my torch may be readily converted from a welding torch to a cutting torch and vice versa, by merely changing the nozzles 5 and 6, as the case may be. Although the combustible gas which is delivered to the space 40 in the torch pipe around the nozzle 21 may be at very low pressure, the injector functions not only to induce a flow of this low pressure gas into the torch pipe and intermix it there with the oxygen, but also to build up a much higher pressure on the mixture between the nozzle 6 and the restriction when the torch is used for welding.

When used for cutting, the mixture of gas and oxygen discharged through the passages 15 around the end of the pipe 11, serves to heat and maintain hot the work to be cut by the jet of oxygen issuing from the passage 12.

Instead of straight oxygen, my torch may be used with ordinary air under suitable pressure as a source of supply of oxygen. But, since the oxygen content of air is only about one-fifth of the total volume thereof, the air must be delivered to the nozzle at a rate of approximately five times as fast as oxygen in order to supply the same volume of oxygen per unit of time. Thus, with the same pressure on the sources of supply, if air is used instead of oxygen, the air passages through the torch must be substantially enlarged. In any case, however, where the torch is to be used with gas from a low pressure source of supply, it is very important that the gas passages leading from said source to the zone around the injector nozzle be of substantial size for the free flow of gas therethrough. It is equally important that back pressure on the venturi be reduced to a minimum by making the restricted portion of the passage therethrough comparatively short, and rapidly increasing the cross-sectional area of the passage beyond the discharge end of said restriction. Likewise, it is important to provide a passageway of comparatively large cross-sectional area between the venturi and the nozzle. Otherwise, the torch will not function with gas, such as gas from a city main which it is primarily designed to use, and which is ordinarily under a pressure of substantially less than one pound per square inch.

While I have described my invention in its preferred embodiment, it is to be understood that words which I have used are words of description rather than of limitation and that changes, within the purview of the appended claim, may be made without departing from the true scope and spirit of my invention in its broader aspects.

What I claim is:

A combined welding and cutting torch adapted for use with a combustible gas drawn directly from a source of supply thereof, such as a city gas main, under low pressure of the order of less than one pound per square inch; said torch comprising a torch pipe; a tip secured to the end of said pipe and having a comparatively small centrally-disposed discharge opening therein and a plurality of comparatively large openings around said central opening; said larger openings communicating with said pipe; passage-forming means communicating with said pipe adapted to conduct said gas from said source of supply thereof to said pipe and forming with said pipe a substantially straight passage of substantial cross-sectional area throughout the major portion of the length thereof, whereby to provide for the free flow therethrough of said gas under said low pressure; means forming a comparatively short, Venturi-like restriction in said passage; a nozzle centrally disposed in said passage in a zone relatively remote from said tip to provide for the free flow of said gas therearound and cooperating with said restriction to form an injector; means communicating with said nozzle for conducting oxygen thereto from a source of supply thereof under comparatively high pressure; whereby the discharge oxygen from said nozzle will induce a flow of said gas from the zone around said nozzle through said restriction; the cross-sectional area of said passage increasing rapidly from the discharge side of said restriction to reduce back pressure on the gas flowing through said restriction; means for conducting oxygen directly from said source of supply thereof to said centrally-disposed discharge opening in said tip, and a valve having an actuating lever adapted to be manipulated by an operator for controlling the flow of oxygen through said last mentioned means; said tip having a threaded portion adapted to cooperate with interchangeable nozzles for converting said torch from a welding to a cutting torch and vice versa.

CHARLES R. RICHTER.

References Cited in the file of this patent

UNITED STATES PATENTS

| Number | Name | Date |
|---|---|---|
| 1,114,706 | Brousseau | Oct. 20, 1914 |
| 1,216,875 | Stettner | Feb. 20, 1917 |
| 1,246,573 | Fausek et al. | Nov. 13, 1917 |
| 1,259,885 | McGee | Mar. 19, 1918 |
| 1,266,858 | Reyburn | May 21, 1918 |
| 1,274,052 | Jenkins | July 30, 1918 |
| 1,316,681 | Burritt | Sept. 23, 1919 |
| 1,361,667 | Baudet | Dec. 7, 1920 |
| 1,424,189 | Strobot | Aug. 1, 1922 |
| 1,660,328 | Fausek et al. | Feb. 28, 1928 |
| 1,662,520 | Jenkins | Mar. 13, 1928 |
| 1,809,652 | Vincent | June 9, 1931 |
| 1,832,623 | Fausek et al. | Nov. 17, 1931 |
| 2,238,470 | Jacobsson et al. | Apr. 15, 1941 |
| 2,348,774 | Anthes | May 16, 1944 |

FOREIGN PATENTS

| Number | Country | Date |
|---|---|---|
| 562,420 | France | Sept. 3, 1923 |